L. Tom Ung   Inventor

Aug. 12, 1958     L. T. UNG     2,847,200
CENTRIFUGAL CONTACTING OF FLUID PHASES
Filed April 30, 1956     2 Sheets-Sheet 2

L. Tom Ung     Inventor

By *Leland W. Nagel* Attorney

United States Patent Office 2,847,200
Patented Aug. 12, 1958

2,847,200

CENTRIFUGAL CONTACTING OF FLUID PHASES

L. Tom Ung, Elizabeth, N. J., assignor to Esso Research and Engineering Company, a corporation of Delaware Application April 30, 1956, Serial No. 581,619

7 Claims. (Cl. 261—84)

The present invention relates to an improved means for contacting fluid phases which are incompletely miscible and which possess different specific gravities. The invention is particularly concerned with an improved apparatus for countercurrently contacting a liquid phase with a vapor or gas phase. This invention has application to a wide variety of phase contacting operations, but it is especially adapted for and directed toward operations in which a vapor is countercurrently contacted with a liquid in a multi-stage type of apparatus. Thus, the invention has particular application to processes such as absorption, scrubbing, distillation, fractionation, stripping and the like. Briefly, the invention relates especially to an apparatus for countercurrently contacting a liquid with a vapor in which centrifugal force is used to mix, separate and also transport the two phases.

It is well known in the chemical art to contact two incompletely miscible fluids that possess different specific gravities for the purpose of transferring components between the phases. For example, the procedure is often employed in extraction processes wherein a valuable component within a stream of vapor is removed from the vapor by contacting it in a countercurrent manner with a liquid which possesses an affinity or solvency for the component. The procedure is also often employed in processes where it is desired to interchange or exchange one or more components from one phase stream with one or more components from another phase stream.

The contacting of a vapor with a liquid is of particular interest in the field of fractional distillation where a mixture of several components having different boiling points or boiling ranges is separated into the individual components. In this connection the invention is of particular interest to the petroleum industry where it is common practice to separate a wide boiling range petroleum fraction or crude oil into a plurality of fractions, each possessing a relatively much narrower boiling range.

At the present time a wide variety of apparatus and procedures have been employed or proposed for contacting fluid phases of the type described above. Among the types of apparatus that have received the widest acceptance are the so-called vertical towers that are filled with packing, or a plurality of contacting plates, such as bubble cap plates, pierced plates or the like. Towers such as these have proven to be reasonably satisfactory for attaining a fair degree of fractionation; but they are marked by relatively low efficiency, low capacity, low feed rates, etc. Furthermore, the towers are relatively large and bulky and therefore expensive from the standpoints of construction and operation. It has therefore been a continuing effort of the chemical industry in general and the petroleum industry in particular to decrease the cost of and to improve upon the efficiency and capacity of vapor-liquid contactors.

In an effort to decrease the cost and to increase the capacity of tower contactors, it has been proposed to use towers or mixer-settler combinations which employ centrifugal force as a contacting aid. As yet, however, no entirely satisfactory and practicable apparatus of this type has been developed or described. In general, the various apparatus that have been proposed employing centrifugal force have been either too expensive or too complex for widespread industrial application. Furthermore, none of the apparatus have been designed so as to utilize very completely the centrifugal forces that are developed. Furthermore, the apparatus in the main are relatively inflexible and are limited to relatively narrow ranges of operating conditions.

Accordingly, it is an object of the present invention to provide an improved means for contacting fluid phases wherein improved contacting efficiencies, lower equipment costs, lower operating costs and greater flexibility of operation are attained. More particularly, it is an object of the invention to provide an improved type of apparatus for countercurrently contacting a vapor with a liquid wherein centrifugal force is employed to mix, separate and also transport the phases. It is a more particular object of the invention to provide an apparatus which is characterized by a relatively simplified and compact form of construction and which, nevertheless, is also characterized by a markedly greater flexibility of operation than are the presently conventional forms of contacting apparatus.

These and other related objectives of the invention are attained in accordance with the invention in a manner which will become more apparent with the description that follows especially when read in conjunction with the attached drawing.

Figure 1 illustrates in vertical cross section a multistage contacting apparatus which constitutes a preferred embodiment of the invention. The apparatus in this instance is employed in a scrubbing operation to remove one component of a gas mixture by contacting the mixture with a suitable liquid.

Figures 2 to 5, inclusive, are exploded isometric views of the various component parts that form each stage of the apparatus of Figure 1.

Figure 1:
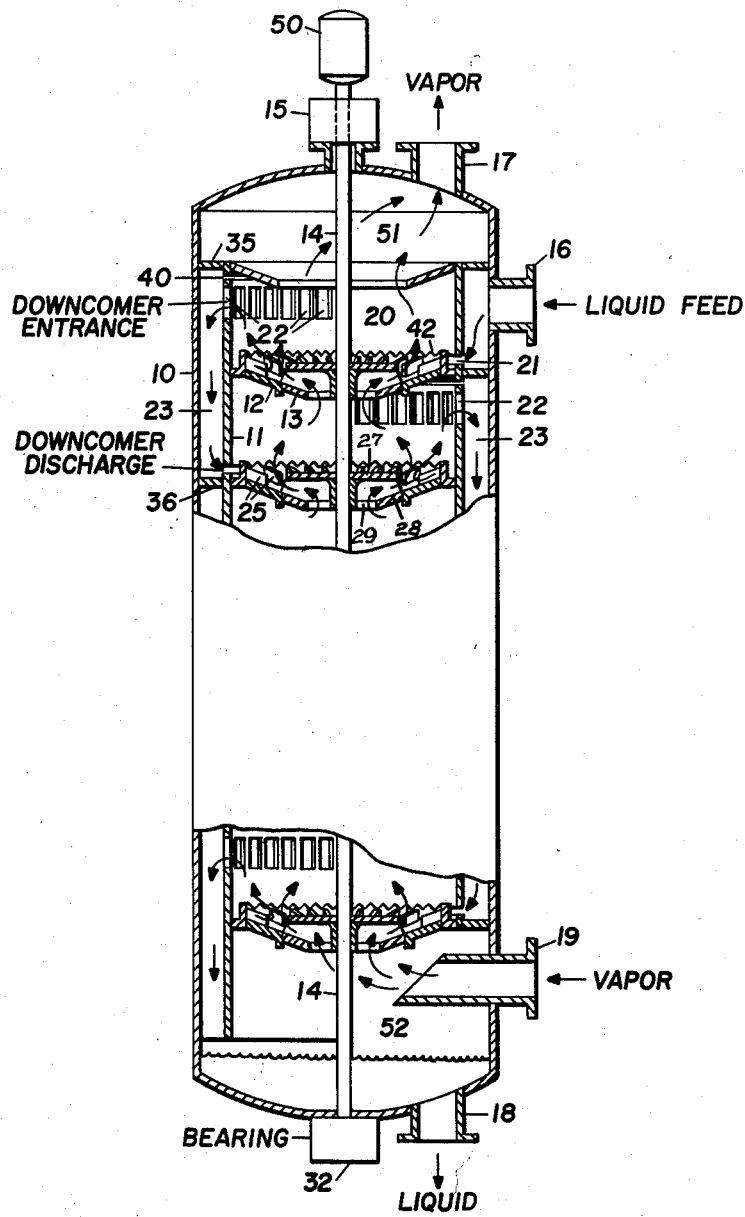

Having briefly described the general contents of each one of the figures, attention is now directed toward a more detailed consideration of the figures. Thus, turning to Figure 1, there is illustrated a multi-stage apparatus adapted to contact countercurrently a vapor with a liquid. The apparatus includes an outer wall member 10, an inner wall member 11, a plurality of deck plates 12, a plurality of vaned rotors 13, a rotor shaft 14, rotor bearings 15 and 32, liquid inlet connection 16, vapor outlet connection 17, liquid bottoms outlet conduit 18 and vapor inlet conduit 19.

The deck plates 12 and the rotor elements 13 are vertically spaced throughout the apparatus to define a plurality of vertically superposed contacting zones 20. Each stage 20 therefore contains a separate deck plate 12, a separate rotor element 13, a liquid entrance connection 21, liquid outlet passageway 22 and downcomer 23. It is apparent from Figure 1 that the downcomers in the apparatus are disputed within the annular space defined by the inner wall member 11 and the outer wall member 10. Thus, the liquid oulet connection from each contacting stage is in essence the entrance to a downcomer, and the liquid inlet to each stage is in essence the discharge connection for a downcomer.

Each deck plate 12, as illustrated, is a substantially circular plate which is secured along its outer periphery to the inner wall member 11 and which extends inwardly and downwardly toward the longitudinal center line of the overall apparatus. The deck plates do not extend entirely toward the center line of the apparatus, but instead terminate in a spaced relationship thereto thereby defining a substantially circular opening in the center of the plates. Expressed otherwise, each deck plate essentially resembles an inverted truncated cone.

Figure 3:
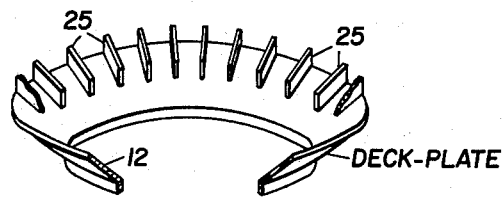
Figure 3 illustrates a preferred form of deck plate which is used in each stage of the apparatus. The plate has been split in two halves for greater clarity.

A plurality of vertically disposed and laterally spaced mixing baffles 25 are secured to the upper surface of each deck plate 12 as illustrated especially in Figure 3. It is the function of these baffles to aid in mixing the vapor and the liquid within each contacting stage. It will be appreciated that a wide variety of baffle configurations may be employed but the radial spacing arrangement which is illustrated in Figure 3 is contemplated to constitute the best such arrangement.

Each deck plate 12 is preferably inclined, as mentioned above, toward the longitudinal center line of the overall contacting apparatus such that liquid flows radially from the outer periphery of the plate toward the inner periphery of the plate. The angle of inclination may be from 0° to 60° with respect to the horizontal and preferably about 10° to 30°.

Figure 4:
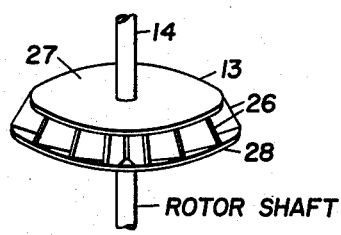
Figures 4 and 5 illustrate a preferred form of impeller component for use in each stage of the apparatus.
Figure 5:
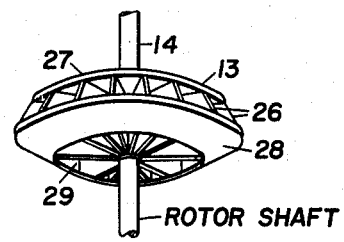

The rotor element 13 in each stage is positioned substantially within the central opening of the deck plate 12 in this stage. The rotor element is provided with a plurality of radially spaced vanes 26 which are adapted to throw liquid or other fluids radially outward from the rotor. The rotor is preferably of the closed type as shown in Figures 4 and 5 where the illustrated impeller has an upper plate member 27 and a lower plate member 28. A fluid passageway 29 is provided in the lower plate member 28 substantially along the rotor shaft 14 so that the fluid, which may be a vapor or a liquid, enters the impeller by passing along the axis thereof. For example, in the present apparatus it is an object to introduce a vapor stream within the vane members 26 of each impeller by passing the vapors upwardly through the passageway 29 directly within the impeller.

As illustrated in Figure 1, it is necessary that the lower end of each rotor element 13 be located within each stage at a point not lower than the inner upper peripheral edge of the deck plate 12 in that stage. It is furthermore necessary that the radially outer periphery of the rotor element be spaced in very close proximity to the inner peripheral edge of the deck plate. By observing these structural conditions substantially all of the vapor passing through the impeller within any given stage is directed along the upper surface of the deck plate in that stage. Recycling or bypassing on the part of the vapor stream is avoided, and a maximum degree of contacting efficiency is attained.

As illustrated in Figures 4 and 5, the vane elements 26 of the rotor 13 are of the straight-blade type. It will be understood, however, that the blades may be curved forward or backward as desired. Furthermore, the blades may be of any desired cross section, as for example, of the airfoil type. Furthermore, the impeller may be of the open type, but the closed type is much to be preferred.

As mentioned earlier, each contacting stage 20 also includes an inner wall member 11 and an outer wall member 10 defining an annular space 23 therebetween.

Figure 2:
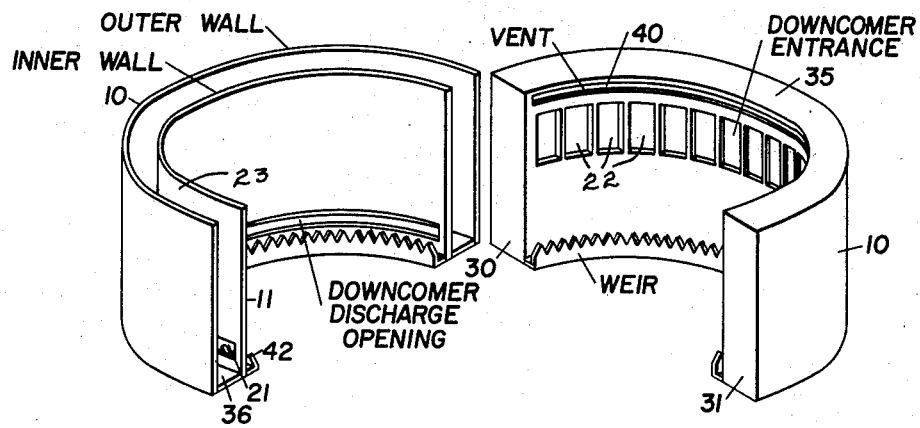
Figure 2 illustrates a preferred type of wall and downcomer construction which employs the principles of the invention.

As particularly illustrated in Figure 2, the annular space 23 is divided into two separate zones by means of vertical plates 30 and 31. In most instances it is preferred that these zones be substantially equal in size. Each zone, i. e., zone 30 and zone 31, forms a downcomer, one of the downcomers connecting any given stage to a stage positioned above the given stage and the other downcomer connecting the given stage with a stage positioned below the given stage. Thus, each contacting stage is provided with the entrance portion of one downcomer and the exit portion of another downcomer.

Taking Figure 1 in conjunction with Figure 2, it will be seen that each downcomer is an arcuately shaped member with an inner wall 11 and an outer wall 10. The downcomer is blanked off at the top and bottom by impervious plates 35 and 36 and is provided with passageways located in the inner wall 11 for the ingress and egress of fluids. As mentioned earlier, each downcomer is provided with a discharge passageway 21 which is positioned near the end of the downcomer and which extends substantially around the entire periphery of the downcomer. Thus, liquid within the downcomer flows from the downcomer through the passageway 21 into a contacting stage disposed within the inner wall of the downcomer. Similarly, an entrance passageway is positioned near the top of the downcomer and consists of one or more openings within the inner wall of the downcomer. As particularly illustrated in Figure 2, it is preferred that the entrance passageway 22 extend substantially around the entire periphery of the downcomer, and that it be spaced slightly below the upper end of top plate 35 of the downcomer. A vent passageway 40 is positioned vertically intermediate the upper end of the downcomer and the top of the downcomer entrance 22 in each stage such that vapors or gases entrapped within the downcomer may escape from the downcomer back into the adjacent contacting stage. As illustrated in Figure 2, the vent passageway 40 may be a relatively small opening in comparison with the size of the downcomer entrance.

As particularly illustrated in Figure 2, a peripheral weir 42 is provided immediately adjacent and radially inward of each downcomer discharge such that liquid flowing from the downcomer through passageway 21 must pass over the weir 42 before entering a contact stage. This weir may be a straight edge type of weir but it is preferably a notched weir such that liquid spilling over the weir forms a plurality of small streams rather than a single weir sheet. A notched weir wherein the notches are essentially triangular cuts is especially preferred.

Further relative to the structure of the weir member 42, it will be observed that this member extends around the entire outer periphery of each contacting stage such that liquid enters the stage from every radial direction. Markedly improved contacting and distribution of liquid within each stage of the apparatus are attained by virtue of this provision.

Each rotor 13 is secured to a rotor shaft 14 which extends throughout the length of the overall apparatus. The upper and lower ends of the shaft are conveniently mounted in suitable bearing members 15 and 32, and the shaft is powered and rotated by any suitable power source 50. The power source may be any one of a large number of conventional devices such as an electric motor, a gas turbine, a reciprocating engine or the like.

In addition to the two end bearings 15 and 32 the rotor shaft 14 may be provided with one or more intermediate bearings along the length of the shaft in order to better support the shaft.

As indicated in Figure 1 the overall apparatus is conveniently provided with an upper disengaging zone 51 located above the uppermost contacting stage and a lower disengaging zone 52 located below the lowermost contacting stage.

Having briefly enumerated and described the major structural components of the apparatus of the present invention, attention is now directed toward a discussion of the manner in which the apparatus functions. Thus, it will be assumed that the apparatus in Figures 1–5 is employed as a multi-stage scrubber in which one component in a stream of mixed vapors is removed therefrom by countercurrently contacting the vapors with a liquid scrubbing medium. The scrubbing medium in this instance will be assumed to have a very distinct preferential solvent action upon the component to be extracted from the vapor stream.

The vapor stream containing the desired component is introduced within the lower disengaging zone 52 of the contacting tower by means of inlet conduit 19. The vapor stream may be fed to the tower by any suitable means as for example by a blower, a compressor, a reboiler, or the like. Once within the tower the vapors are propelled through the tower by means of the plurality of rotors 13 which in turn are driven by means of the rotor shaft 14 and the power source 50.

The flow path of the vapor stream through the apparatus is indicated by the arrows indicating upward movement in Figure 1. Liquid flow is indicated by arrows showing downward movement. There it will be seen that the vapors enter the axial opening or passage 29 in the lower surface 28 of each rotor element and are thrown by the vanes 26 of the rotor into the contacting area immediately above the rotor. It will further be noted that the vanes direct the vapors radially outward directly across the upper surface area of the deck plates 12. It is along the surface of the deck plate in each contacting zone or stage that the vapors come in intimate contact with the liquid or liquids that enter the stage. Following contact with the liquid, the vapors rise along the outer radial portion of the stage and then flow into the axial opening of the rotor leading to the stage immediately above. This flow pattern of the vapor stream is repeated until the stream finally enters the upper disengaging zone or section 51 positioned above the uppermost contacting stage. From this point the vapor stream is withdrawn from the apparatus by means of conduit 17 and is directed to any desired storage vessel or the like.

The liquid scrubbing medium enters the top of the tower and is withdrawn eventually from the disengaging zone 52 at the bottom of the tower. It will be appreciated that the scrubbing liquid may be added or introduced within the tower at a variety of points; but as indicated in Figure 1, it is preferred that it be introduced by means of a conduit 16 which leads to the annular space 23 between the inner and outer walls 11 and 10 of the tower. From this point the liquid flows through the downcomer discharge opening 21 of the topmost contacting stage and thence over the peripheral distribution weir 42. As it flows over the weir, the liquid is distributed over the entire upper surface area of the deck plate 12 and thereby is contacted with the vapor stream flowing across the plate in a very intimate manner. Since the vapor stream has a pronounced swirling motion as a result of the action of rotor 13 the vapor and the liquid upon the deck plate 12 are violently intermixed with the result that the liquid is fragmented into very small particles and dispersed throughout the vapor stream. The mixing baffles 25 contribute very markedly to the fragmentation process and enhance the degree of contacting that occurs between the vapor and the liquid.

The vapor stream containing the fragmented liquid particles rises from the deck plate 12 and moves upwardly into the region of the contacting stage above the plate. The vapor stream, still swirling from its contact with the rotor blades, gives rise to a centrifugal action which throws the entrained liquid particles outwardly and against the inner surface of the wall 11. Here the particles collect and continue to move in an upward direction substantially as a liquid film until they reach the downcomer entrance passageway 22. The liquid then flows through the passageway 22 into the upper portion of the downcomer 23 and drops downwardly in the downcomer to the entrance passageway to a contacting zone located below the contacting zone in question. In most instances, the liquid removed from one zone will flow next into the zone immediately below the first zone. In some cases, however, it may be desirable to direct at least a portion of the downflowing liquid to a zone other than the immediately next lower zone.

It will be noted that the vapor velocity through the contacting tower must at all times be sufficient to attain two objectives. First, it is necessary that the velocity be sufficient to generate a centrifugal action sufficient to cause liquid particles that are entrained within the vapors to move outwardly from the center line of the tower. Thus, the vapor stream must possess a velocity sufficient to fragment the liquid and thereafter separate the fragmented particles from the vapor by centrifugal action. Second, the vapor stream must also have a velocity of a magnitude such that the liquid, once separated by centrifugal force from the vapor, is directed upwardly along the inner wall surface of the tower so that it passes through the elevated downcomer entrance passageways into the downcomers.

In order to attain the two conditions just described, it is necessary in most vapor-liquid contacting operations that the vapor possess a superficial velocity of at least 10 feet per second and preferably at least about 50 feet per second.

In accordance with the present invention, these velocities are attained and maintained by supplying the vapor stream to the contacting vessel in sufficient quantities and also by imparting energy to the vapor stream by means of the plurality of rotors 13. Indeed, it is a characteristic of the invention that it is possible to furnish the necessary energy for the essential functions of mixing, phase separation and transfer of the two contacted phases by use of the centrally located set of spinning rotors. The operation of gravity, a limitation with most conventional contacting apparatus, is substantially eliminated as an important factor in the present apparatus. Furthermore, the volume and linear dimensions of the contacting stages are greatly reduced by virtue of the utilization of centrifugally induced forces whereby the operations of mixing, phase separation and phase transportation occur much more efficiently and rapidly.

While it is preferred that the present apparatus be employed in the form of a vertical tower, it is also contemplated that horizontally disposed multi-stage assemblies may also be used. Transport of liquid from one stage to the next is readily realized. The rotors and closed contact stages permit the development of pressure differentials which effectively "pump" the liquid from stage to stage. They may be designed to produce say 1 p. s. i. per stage, which would give ample reserve over conventional equipment, which normally operates with much less than ⅓ of this pressure differential.

As will be apparent from the foregoing description as well as from the figures in the drawing, the stage contacting operation just described is repeated throughout the tower illustrated in Figure 1 until the vapor stream exits from the top of the tower and the liquid from the bottom of the tower. As a result of the repeated contacts between the two streams, the liquid is able to very efficiently remove the desired component or components from the vapor stream fed to the operation.

The foregoing description has been intended merely to illustrate the general principles of the invention and it is not intended that the invention be limited to this particular embodiment or operation. Instead, as indicated earlier, the invention has broad application to all contacting operations in which two incompletely miscible phases having different specific gravities are contacted with one another. Thus, the invention has application especially to distillations in which a mixture of two or more components are separated or fractionated in accordance with the boiling points of the components. In this type of operation it will be noted that the feed stream to the fractionating unit should be at least partially vaporized and may be introduced within one or more stages of the apparatus. Furthermore, at least a portion of the overhead vapor stream and the liquid bottoms stream may be returned to the unit at one or more points in the form of reflux.

In addition to the process modifications must mentioned, it will be understood that the invention also is susceptible of numerous apparatus modifications. Thus, it is contemplated that a wide variety of liquid level controllers, pressure regulators, feed supply devices and the like may be employed in conjunction with the invention. Furthermore, it is contemplated that the rotors may be rotated at different speeds relative to one another and that rotors of different sizes and configurations may be used in the same unit. It is further contemplated that varying stage heights may be employed and that the apparatus may be operated under sub-atmospheric conditions as well as under superatmospheric conditions. Vacuum operation is considered to be particularly well carried out by the present invention, since the low fluid hold ups, low residence times and an inverse pressure differential between the overhead condenser and the bottoms reboiler permits lower bottom section temperatures. These lower temperatures inherently minimize any tendency toward cracking, a condition which is of the greatest importance in petroleum refining operations.

The inverse pressure differential of the present apparatus by permitting lower reboiler temperatures and higher overhead condenser temperatures in fractionation operations greatly reduces heat exchange surface requirements. Indeed, in the case of fractionations involving close-boiling components it is contemplated that the condenser and the reboiler may be combined into a single heat exchange unit with the possible addition of a booster reboiler to compensate for the heat losses.

What is claimed is:

1. An apparatus for countercurrently contacting two fluids of differing specific gravities which comprises in combination a vertical chamber having inner and outer walls forming an annular space defining downcomers, said vertical chamber being made up of a number of contact stage sections, each section in turn having inner and outer walls forming an annular space, the sections being assembled such that the annular space is partitioned off into a number of semi-annular downcomers extending alternately over two stages, a plurality of vertically spaced baffled circular deck plates disposed within said tower and defining a plurality of vertically superposed contacting zones connected by said downcomers, each of said plates extending from an inner wall member downwardly towards the centerline of said chamber and being provided with a centrally disposed opening, a horizontally disposed, vaned rotor positioned within each of said central openings, means for rotating said rotor, conduit means in the upper and lower portion of said chamber adapted to introduce the lighter and heavier phases respectively, ingress means positioned near the upper end of each of said downcomers, egress means positioned near the lower end of each of said downcomers, and vent passageways positioned intermediate the upper end of said downcomers and said ingress means.

2. The apparatus of claim 1 wherein the rotor comprises an impeller having an upper and a lower plate member.

3. The apparatus of claim 1 wherein said deck plate has an angle of inclination of not greater than about 60°.

4. The apparatus of claim 3 wherein said deck plate baffles are radially disposed.

5. The apparatus of claim 1 wherein the top and bottom of each of said downcomers is blanked off by impervious plates.

6. The apparatus of claim 1 having a weir member adjacent to and radially inward of each of said downcomers.

7. The apparatus of claim 6 wherein said weir member is notched.

References Cited in the file of this patent

UNITED STATES PATENTS

| | | |
|---|---|---|
| 786,113 | Grohman | Mar. 28, 1905 |
| 945,936 | Gow | Jan. 11, 1910 |
| 1,079,849 | Ernst | Nov. 25, 1913 |
| 1,083,068 | Egler | Dec. 30, 1913 |
| 1,607,043 | Benson | Nov. 16, 1926 |
| 1,776,644 | Vreeland | Sept. 23, 1930 |
| 1,780,255 | Wagner | Nov. 4, 1930 |
| 1,832,701 | Graham | Nov. 17, 1931 |
| 2,156,954 | Nelson et al. | May 2, 1939 |
| 2,396,526 | Nilsson | Mar. 12, 1946 |

FOREIGN PATENTS

| | | |
|---|---|---|
| 479,765 | Germany | July 22, 1929 |
| 1,064,079 | France | Dec. 23, 1953 |